Oct. 23, 1945. R. HARGREAVES ET AL 2,387,260
SPINDLE
Filed May 24, 1944
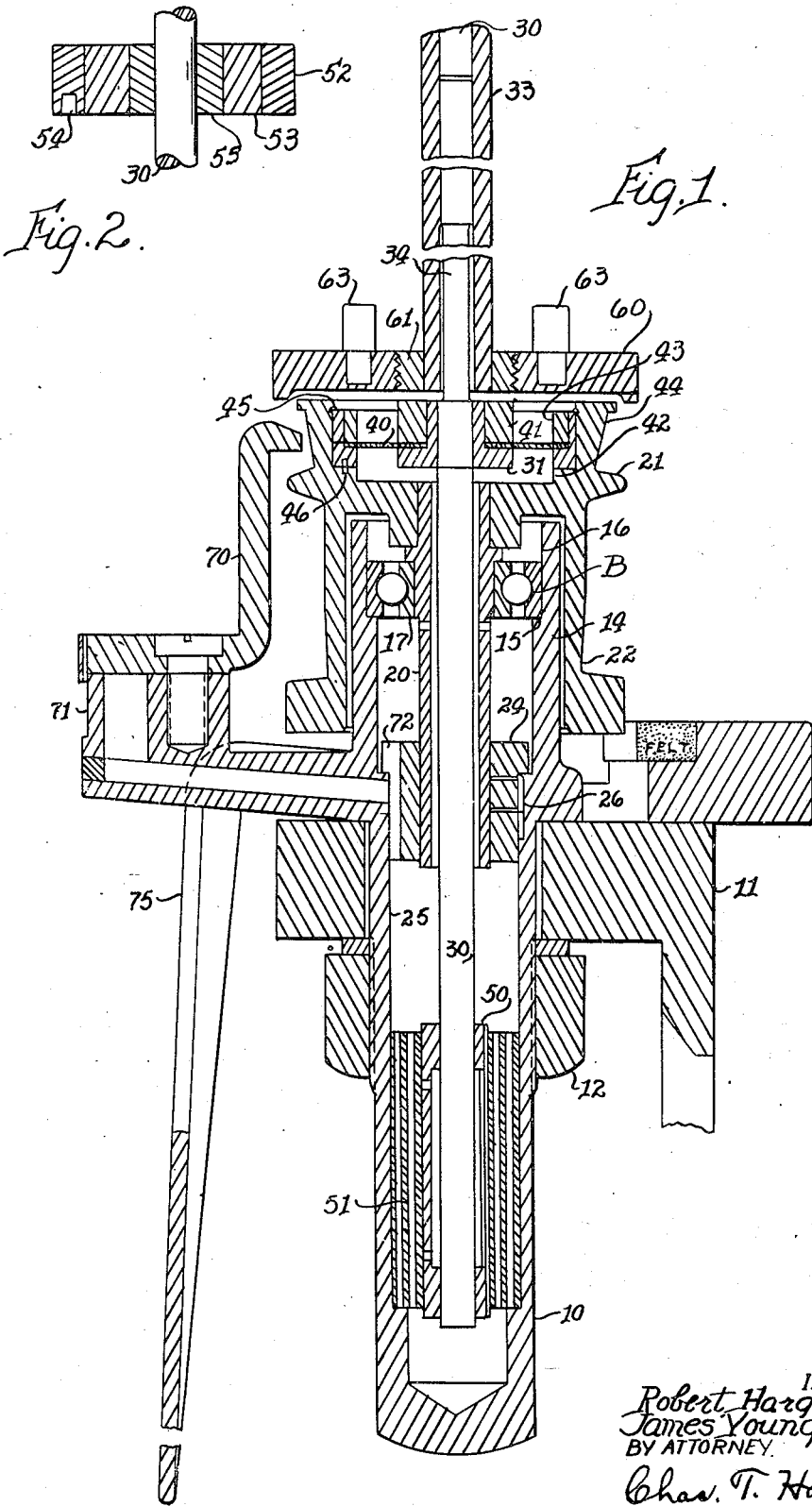
INVENTOR.
Robert Hargreaves.
James Youngsma
BY ATTORNEY.
Chas. T. Hawley Patented Oct. 23, 1945

2,387,260

UNITED STATES PATENT OFFICE 2,387,260

SPINDLE

Robert Hargreaves and James Youngsma, Whitinsville, Mass., assignors to Whitin Machine Works, Whitinsville, Mass., a corporation of Massachusetts Application May 24, 1944, Serial No. 537,116

4 Claims. (Cl. 57—135)

This invention relates to spindles adapted for use in spinning and twisting textile fibers, such as cotton, wool or rayon. Our invention relates more specifically to the belt-driven type of heavy spindle adapted for use in twisters and on which large and heavy yarn spools are rotated at relatively high speeds.

It is the general object of our invention to provide an improved spindle which is flexible and self-centering, so that a slightly unbalanced load may be rotated thereon at relatively high speed and without objectionable vibration.

To the attainment of this object, we provide a spindle having a blade of limited inherent flexibility, and we support and drive this flexible blade through a flexible diaphragm connection to a driving whorl. We mount the driving whorl on a sleeve having positively supported upper and lower bearings. The upper bearing is of "ball" type and also forms a thrust bearing to vertically position the driving whorl and the diaphragm connection relative to the spindle base. We also provide improved means for vertically adjusting the yarn spool supporting plate relative to the spindle blade.

Our invention further relates to arrangements and combinations of parts which will be hereinafter described and more particularly pointed out in the appended claims.

Preferred forms of the invention are shown in the drawing, in which

Fig. 1 is a sectional side elevation of our improved spindle; and

Fig. 2 is a detail sectional view of a modified construction.

The spindle comprises a base 10 secured to a spindle rail 11 in the usual manner, as by a clamping nut 12. The base 10 has an upward extension 14 with a shoulder 15 which determines the vertical position of the outer race 16 of a ball bearing B of the thrust type. The inner race 17 of the bearing B is forced against a flange on a bearing sleeve 20, the upper end of which sleeve is firmly seated in the driving whorl 21.

The belt-engaging portion 22 of the whorl extends downward outside of the ball bearing B and also outside of the base extension 14 and free therefrom. It will also be noted that the ball bearing B is located at the same height as the middle of the driving belt, so that the pull of the belt is directly sustained by the ball bearing.

The lower end of the sleeve 20 is a free running fit in a bushing 24 which is loosely inserted in the upper end of a recess 25 in the base 10 but is held from rotation by a key 26. Two thousandths of an inch or more clearance may be provided between the sleeve 20 and bushing 24 and also between the bushing and the wall of the recess 25.

The blade 30 has a flanged collar 31 forced thereon intermediate its ends, and the upper end of the blade 30 is forced into a bobbin-driving tube 33. Between the collar 31 and the upper end of the blade, the blade is made with reduced diameter, as indicated at 34, to provide limited flexibility.

A diaphragm 40 is confined between the flanged collar 31 and a ring 41 which is forced thereon. The periphery of the diaphragm 40 is similarly confined between a flanged bushing 42 and a ring 43 forced therein. The bushing 42 slips easily in a recessed upward extension 44 of the whorl 21 and is held from displacement by a locking ring 45. A pin 46 forms a driving connection between the whorl 21 and the bushing 42.

It will be noted that the blade 30 has substantial clearance with respect to the whorl sleeve 20, and is also free with respect to the bobbin driving tube 33 except as its extreme upper end is attached thereto. The lower end of the blade 30 extends loosely into a bearing sleeve 50 which is mounted for yielding or damped transverse movement in a coiled leaf spring 51.

A bobbin or spool supporting and driving plate 60 has a threaded connection with a flange 61 which is fixed to the lower end of the driving tube 33. By rotating the plates 60 relative to the flange 61, the plate 60 may be raised or lowered with respect to the diaphragm 40 and relatively to the driving whorl 21. The desired vertical adjustment may be retained by tightening a locking screw not shown. Pins 63 in the plate 60 provide driving engagement with the spool or bobbin.

The usual doffer guard 70 may be provided and is preferably mounted on an oil well 71 communicating with a vertical slot or passage 72 in the periphery of the bushing 24. The usual knee brake lever 75 may also be provided.

Our improved spindle, constructed as above described, has been found exceptionally satisfactory for its intended purposes. It will be particularly noted that the blade 30 is laterally yielding with respect to the driving whorl 21, except at the point of connection thereto through the diaphragm 40. The blade 30 is also laterally yielding at its lower end with respect to the base 10 by reason of its clearance in the sleeve 50 and more particularly by reason of the yielding support of the sleeve 50 by the coiled leaf spring 51.

Furthermore it will be noted that the whorl 21 and its bearing sleeve 20 are positively supported, both vertically and radially, only by the ball bearing B, which in turn is located directly in line with the pull of the driving belt. Substantial clearance is provided between the sleeve 20 and the bushing 24 and also between the bushing 24 and the inner wall of the recess 25, all as above set forth.

The entire freedom of the blade 30 and also of the whorl 21 from positive restraint, except by the diaphragm 40 and by the ball bearing B, produces a self-centering and nonvibratory effect in a heavy spindle which is a substantial and definite advance over any spindle previously designed and of which we have any knowledge.

In Fig. 2 we have shown a modified construction which may be used in place of the diaphragm 40. In this modified construction, a collar 55 is forced on the spindle blade 30, and a ring 52 is spaced from the collar 55 by an annular rubber insert 53 which yieldingly connects the parts 55 and 52. The ring 52 may be held in the recess in the extension 44 of the whorl 22 by a snap ring, as in the preferred form, and an opening 54 is provided to receive the driving pin 46. The advantages and operation of this form of our invention are the same as previously described with reference to the construction shown in Fig. 1.

Having thus described our invention and the advantages thereof, we do not wish to be limited to the details herein disclosed, otherwise than as set forth in the claims, but what we claim is:

1. A spindle comprising a slightly flexible blade, a tubular yarn-package-supporting member fixed at its upper end only to said blade and elsewhere free therefrom, a flexible diaphragm clamped to an intermediate part of said blade and below said tubular supporting member, a belt-driven whorl for said spindle, means to clamp the periphery of said diaphragm to an upward annular extension of said whorl, a depending inner whorl sleeve fixed at its upper end to an upper part of said whorl and supporting said whorl, a fixed spindle base having a tubular upward extension, a ball bearing for said whorl having its inner race fixed to an intermediate portion of said whorl sleeve and abutting an overlying shoulder thereof and having its outer race slidably insertable in an enlarged recess at the upper end of said upward base extension and seated against an underlying shoulder therein, said ball bearing being effective both as a radial bearing and as a thrust bearing and forming the only vertical support for said whorl, blade and yarn package, a bushing loosely but non-rotatably insertable in said base and providing a relatively loose cylindrical bearing for the lower part of said depending whorl sleeve, and a relatively loose cylindrical bearing member for the lower end of said blade, which member is mounted for yielding transverse movement in the lower end portion of said spindle base, and said blade being at all times free of contact with said driving whorl and said depending whorl sleeve.

2. The combination in a spindle as set forth in claim 1, in which the ball thrust bearing for the driving whorl is positioned in the plane of the vertical center line of the belt-engaged surface of said whorl and directly receives and resists the belt tension.

3. In a spindle, a spindle blade, a depending tube fixed at its upper end only to the upper end of said blade, and a yarn-package-supporting plate having threaded engagement with the lower end of said tube and being vertically adjustable on said tube and blade by angular rotation of said plate relative to said tube.

4. A spindle comprising a slightly flexible blade, a tubular yarn-package-supporting member fixed at its upper end only to said blade and elsewhere free therefrom, a belt-driven whorl for said spindle, a flexible member positioned below said tubular supporting member and interposed between an intermediate part of said blade and an upward annular extension of said whorl, a depending inner whorl sleeve fixed at its upper end to an upper part of said whorl and supporting said whorl, a fixed spindle base having a tubular upward extension, a ball bearing for said whorl having its inner race fixed to an intermediate portion of said whorl sleeve and abutting an overlying shoulder thereof and having its outer race slidably insertable in an enlarged recess at the upper end of said upward base extension and seated against an underlying shoulder therein, said ball bearing being effective both as a radial bearing and as a thrust bearing and forming the only vertical support for said whorl, blade and yarn package, a bushing loosely but non-rotatably insertable in said base and providing a relatively loose cylindrical bearing for the lower part of said depending whorl sleeve, and a relatively loose cylindrical bearing member for the lower end of said blade, which member is mounted for yielding transverse movement in the lower end portion of said spindle base, and said blade being at all times free of contact with said driving whorl and said depending whorl sleeve.

ROBERT HARGREAVES.
JAMES YOUNGSMA.